(12) United States Patent
Jung

(10) Patent No.: US 9,209,641 B2
(45) Date of Patent: Dec. 8, 2015

(54) COMMUNICATION METHOD, COMMUNICATION SYSTEM, AND ENERGY STORAGE SYSTEM INCLUDING THE SAME

(75) Inventor: Yeon-Sung Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 133 days.

(21) Appl. No.: 14/117,612

(22) PCT Filed: Mar. 30, 2012

(86) PCT No.: PCT/KR2012/002356
§ 371 (c)(1),
(2), (4) Date: Nov. 13, 2013

(87) PCT Pub. No.: WO2013/035953
PCT Pub. Date: Mar. 14, 2013

(65) Prior Publication Data
US 2014/0077768 A1    Mar. 20, 2014

Related U.S. Application Data

(60) Provisional application No. 61/531,812, filed on Sep. 7, 2011.

(51) Int. Cl.
| | |
|---|---|
| H02J 7/00 | (2006.01) |
| G06F 13/42 | (2006.01) |
| H02J 3/32 | (2006.01) |
| H02J 3/38 | (2006.01) |
| H02J 7/34 | (2006.01) |
| H04Q 9/00 | (2006.01) |

(52) U.S. Cl.
CPC ............... *H02J 7/007* (2013.01); *G06F 13/42* (2013.01); *H02J 3/32* (2013.01); *H02J 3/382* (2013.01);

(Continued)

(58) Field of Classification Search
CPC ............. H02J 7/007; H02J 3/32; H02J 3/382; H02J 7/0022; H02J 7/0026; H02J 7/34; G06F 13/42; H04Q 9/00
USPC ........................................................ 320/134
See application file for complete search history.

(56) References Cited

U.S. PATENT DOCUMENTS 3,828,145 A * 8/1974 Carbrey ..................... 370/285
3,903,370 A * 9/1975 Carbrey et al. ............. 370/363
(Continued)

FOREIGN PATENT DOCUMENTS

| EP | 2 204 873 A1 | 7/2010 |
| EP | 2 293 375 A1 | 3/2011 |

OTHER PUBLICATIONS

Written Opinion of PCT/KR2012/002356 mailed on Nov. 1, 2012, pp. 1-4.

(Continued)

*Primary Examiner* — Vuthe Siek
(74) *Attorney, Agent, or Firm* — Christie, Parker & Hale, LLP

(57) ABSTRACT

There is provided a battery system including a system bus, a system controller coupled to the system bus and configured to transmit one or more first system frames on the system bus, and one or more battery subsystems coupled to the system bus and configured to transmit one or more second system frames on the system bus, wherein at least one of the one or more battery subsystems including a storage system for storing power, and a storage system controller for controlling charging and discharging of the storage system, for receiving storage system data, and for transmitting the one or more second system frames including the storage system data on the system bus, wherein at least one of the system controller or the storage system controller is configured to apply a system frame division signal on the system bus between the system frames.

20 Claims, 7 Drawing Sheets

(52) U.S. Cl.
CPC ............ *H02J 7/0022* (2013.01); *H02J 7/0026* (2013.01); *H02J 7/34* (2013.01); *H04Q 9/00* (2013.01); *H04Q 2209/30* (2013.01); *Y02E 70/30* (2013.01)

(56) References Cited

U.S. PATENT DOCUMENTS

| | | | |
|---|---|---|---|
| 6,799,234 B1 * | 9/2004 | Moon et al. | 710/110 |
| 7,293,103 B1 | 11/2007 | Lin et al. | |
| 2003/0085621 A1 | 5/2003 | Potega | |
| 2007/0018615 A1 | 1/2007 | Graf et al. | |
| 2008/0307240 A1 | 12/2008 | Dahan et al. | |
| 2010/0007311 A1 | 1/2010 | Colin et al. | |
| 2011/0161024 A1 | 6/2011 | Sim et al. | |

OTHER PUBLICATIONS

International Search Report of PCT/KR2012/002356 mailed on Nov. 1, 2012, pp. 1-3.

ISO/CD 11898-1, Road vehicles-Controller area (CAN)—Part 1: Data link layer and physical signalling, Oct. 1999, pp. 1-51.

Pazul, Keith, Controller Area Network (CAN) Basics, Microchip Technology Inc., 1999, pp. 1-9.

EPO Supplemental Search Report dated Sep. 28, 2015, for corresponding European Patent application 12829312.3, (8 pages).

Bartolomeu, P., et al., *Enforcing Flexibility in Real-Time Wireless Communications: A Bandjacking Enabled Protocol*, Emerging Technologies & Factory Automation, IEEE, Sep. 22, 2009, pp. 1-4, XP031575749.

\* cited by examiner

COMMUNICATION METHOD, COMMUNICATION SYSTEM, AND ENERGY STORAGE SYSTEM INCLUDING THE SAME

CROSS-REFERENCE TO A RELATED APPLICATION

This application is a National Phase Patent Application of International Patent Application Number PCT/KR2012/002356, filed on Mar. 30, 2012, which claims priority of U.S. Patent Application No. 61/531,812, filed on Sep. 7, 2011, which are hereby incorporated by reference in their entireties.

BACKGROUND

1. Field

One or more embodiments of the present invention relate to a communication method, a communication system, and an energy storage system including the communication system.

2. Description of Related Art

As destruction of the environment and resource depletion are becoming severe, interest in a system capable of storing energy and effectively utilizing the stored energy is increasing. There has also been interest in new sources of renewable energy, which do not cause pollution, or which cause little pollution during a power generation process. An energy storage system may be a system for connecting new renewable energy, a battery system for storing power, and an existing grid. Energy systems have recently undergone much research in accordance with environmental changes.

In such an energy storage system, a battery system may be designed in various ways according to an amount of power to be supplied to a load, that is, a load amount. The battery system may receive power from the outside, store the power, and supply the stored power to the outside. That is, the battery system may perform charging and discharging operations.

A battery system monitors an internal state thereof to stably operate, and collects data measured through the monitoring. In this regard, the battery system includes various battery managing units having a master-slave structure. The battery managing units corresponding to slaves transmit the measured data to the battery managing unit corresponding to a master, and the battery managing unit corresponding to the master receives and collects all of the data.

SUMMARY

One or more embodiments of the present invention include a communication method and a communication system capable of reducing the likelihood of an error during transmission of data, and an energy storage system including the communication system.

According to an embodiment of the present invention, there is provided a battery system including a system bus, a system controller coupled to the system bus and configured to transmit one or more first system frames on the system bus, and one or more battery subsystems coupled to the system bus and configured to transmit one or more second system frames on the system bus, wherein at least one of the one or more battery subsystems includes a storage system for storing power, and a storage system controller for controlling charging and discharging of the storage system, for receiving storage system data, and for transmitting the one or more second system frames including the storage system data on the system bus, wherein at least one of the system controller or the storage system controller is configured to apply a system frame division signal on the system bus between the system frames.

The storage system controller may be configured to control charging and discharging of the storage system.

The system controller may be configured to operate as a master on the system bus, and the storage system controller may be configured to operate as a slave on the system bus.

The system controller may be configured to command transmission of the storage system data to the storage system controller by transmitting at least one of the first system frames on the system bus, and the system controller or the storage system controller may be configured to apply the system frame division signal on the system bus while the storage system data is being prepared.

The storage system controller may be configured to transmit the storage system data to the system controller by transmitting one or more of the second system frames on the system bus after the system frame division signal stops being applied to the system bus.

A communication protocol between the system controller and the storage system controller of the at least one of the one or more battery subsystems is a controller area network (CAN) protocol.

The at least one of the one or more battery subsystems may further include a subsystem bus, and one or more battery modules for storing the power, at least one of the one or more battery modules may be coupled to the storage system controller through the subsystem bus.

The at least one of the one or more battery modules may include one or more battery cells for storing the power, and a module controller for controlling charging and discharging operations of the one or more battery cells and for transmitting to the storage system controller module data corresponding to information of the one or more battery cells.

The storage system controller may be configured to operate as a master on the subsystem bus, and the module controller may be configured to operate as a slave on the subsystem bus.

The storage system controller may be configured to transmit one or more first storage system frames on the subsystem bus, and the module controller may be configured to transmit one or more second storage system frames on the subsystem bus.

The storage system controller may be configured to command transmission of the module data by transmitting at least one of the first storage system frames on the subsystem bus, and the storage system controller or the module controller may be configured to apply a storage system frame division signal on the subsystem bus while the module data is being prepared.

The module controller may be configured to transmit the module data to the storage system controller by transmitting one or more of the second storage system frames on the subsystem bus after the storage system frame division signal stops being applied to the subsystem bus.

A communication protocol between the storage system controller and the module controller of the at least one of the one or more battery modules may be a controller area network (CAN) protocol.

According to another embodiment of the present invention, there is provided a communication system having a master-slave structure including a system bus, a master for transmitting on the system bus a command frame including a command, and a plurality of slaves for receiving the command frame from the system bus, for performing an operation corresponding to the command in the command frame, and for transmitting one or more data frames including data on the system bus, wherein at least one of the master or the plurality of slaves is configured to apply a frame division signal on the system bus between the frames.

The frame division signal may be applied on the system bus by the master or one of the slaves that last received one of the frames.

The master may be a system controller of a battery system, the plurality of slaves may be storage system controllers corresponding to racks of the battery system, and the data may correspond to information of one or more battery cells in the battery system.

The master may be a storage system controller corresponding to a rack of a battery system, the plurality of slaves may be module controllers corresponding to trays of the rack, and the data may correspond to information of one or more battery cells in the rack.

The frame division signal may be applied during an interframe space between two adjacent ones of the frames, the interframe space including an intermission section and a bus idle section, a voltage level of the frame divisional signal applied during the bus idle section being opposite a voltage level of a remaining portion of the bus idle section.

According to another embodiment of the present invention, there is provided a communication system including a system bus, and a plurality of devices coupled to the system bus, at least one of the devices being configured to transmit on the system bus a command frame including a command, and at least another one of the devices being configured to receive the command frame from the system bus, to perform an operation corresponding to the command in the command frame, and to transmit one or more data frames on the system bus, wherein at least one of the devices is configured to apply a frame division signal on the system bus between the frames.

The frame division signal may be applied on the system bus by one of the at least one of the devices that is configured to apply a frame division signal and last received one of the frames.

The frame division signal may have a voltage level that is different from voltage levels applied on the system bus just before and after the frame divisional signal is applied.

The frame division signal may be applied during an interframe space between two adjacent ones of the frames, the interframe space may include an intermission section and a bus idle section, and the voltage level of the frame divisional signal applied during the bus idle section may be opposite the voltage level of a remaining portion of the bus idle section.

The frame division signal may be for occupying the system bus to prevent transmission by the devices other than one of the devices applying the frame division signal.

According to another embodiment of the present invention, there is provided a data transmission method including transmitting a command on a bus by a master to a plurality of slaves to transmit data, applying a frame division signal on the bus by the master or any of the plurality of slaves that is a target of the command to initiate a pause of the transmission, when one of the slaves is ready to transmit the data on the bus, canceling the pause of the transmission, transmitting the data on the bus to the master, and receiving the transmitted data by the master through the bus.

The frame divisional signal may be applied on the bus by the master or one of the slaves that last received the transmitted command or the transmitted data.

According to embodiments of the present invention, an error may be prevented from occurring during transmission of data.

Figure 1:
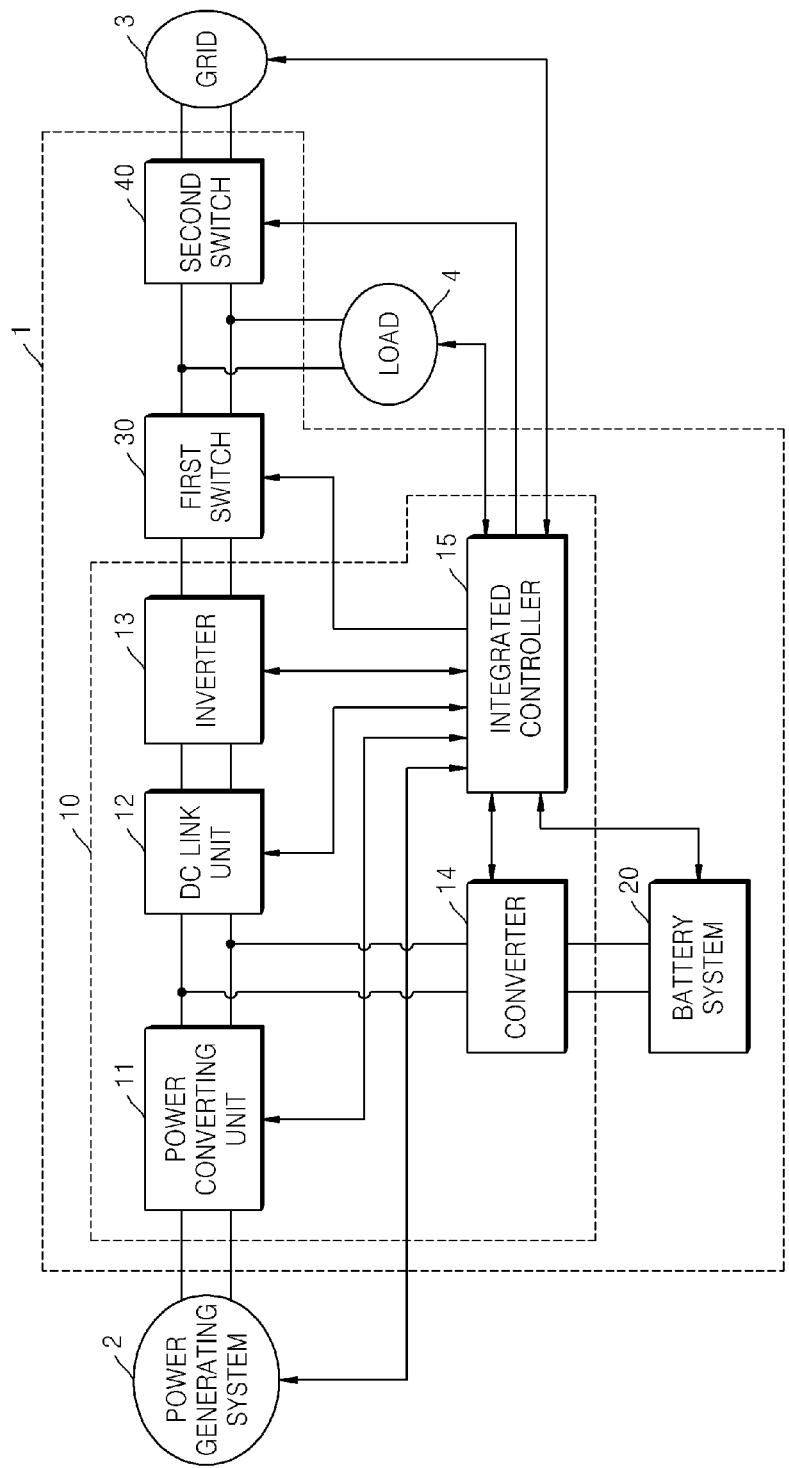
FIG. 1 is a block diagram of an energy storage system, according to an embodiment of the present invention.

According to an embodiment of the present invention, there is provided a battery system including a system bus, a system controller coupled to the system bus and configured to transmit one or more first system frames on the system bus, and one or more battery subsystems coupled to the system bus and configured to transmit one or more second system frames on the system bus, wherein at least one of the one or more battery subsystems includes a storage system for storing power, and a storage system controller for controlling charging and discharging of the storage system, for receiving storage system data, and for transmitting the one or more second system frames including the storage system data on the system bus, wherein at least one of the system controller or the storage system controller is configured to apply a system frame division signal on the system bus between the system frames.

DETAILED DESCRIPTION

Embodiments of the present invention will now be described more fully with reference to the accompanying drawings, in which exemplary embodiments of the present invention are shown. Embodiments of the present invention may, however, be embodied in many different forms, as will be understood by one of ordinary skill in the art, without departing from the spirit and scope of the present invention. As the present invention is not limited to the embodiments described in the present description, it should be understood that the present invention includes variations and equivalents included in the spirit and scope of the present invention. In the description, detailed descriptions of well-known functions and structures may be omitted so as not to hinder the understanding of the present invention.

The terminology used herein is for the purpose of describing particular embodiments only, and is not intended to be limiting. As used herein, the singular forms "a", "an", and "the" are intended to include the plural forms as well, unless the context clearly indicates otherwise. It will be further understood that the terms "including," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Reference will now be made in detail to embodiments of the present invention, examples of which are illustrated in the accompanying drawings, wherein like reference numerals refer to like elements throughout, and thus repeated descriptions will be omitted.

FIG. 1 is a block diagram of an energy storage system 1, according to an embodiment of the present invention.

Referring to FIG. 1, the energy storage system 1 of the current embodiment is connected to a power generation system (e.g., a power generating system) 2 and a grid 3 to supply power to a load 4.

The power generation system 2 is a system for generating power by using an energy source. The power generation system 2 supplies the generated power to the energy storage system 1. The power generation system 2 may be, for example, a solar power generation system, a wind power generation system, a tidal power generation system, or the like. However, the present invention is not limited thereto. The power generation system 2 may use new renewable energy, such as solar heat or geothermal heat. In particular, a solar cell for generating electric energy by using solar light may be easily installed in a house or a factory, and thus may be efficiently used in the energy storage system 1 installed in a house or a factory. The power generation system 2 includes a plurality of power generation modules arranged in parallel, and generates power using each power generation module, thereby configuring a large capacity energy system.

The grid 3 includes a power generating station, an electric power substation, a power line, and the like. When the grid 3 is in a normal state, the grid 3 supplies power to the energy storage system 1 to allow power to be supplied to the load 4 and/or a battery system 20, and receives power from the energy storage system 1. When the grid 3 is in an abnormal state, power supply from the grid 3 to the energy storage system 1 is stopped, and power supply from the energy storage system 1 to the grid 3 is also stopped.

The load 4 may consume power generated by the power generation system 2, power stored in the battery system 20, or power supplied from the grid 3. For example, the load 4 may be a house, a factory, or the like.

The energy storage system 1 may store power generated by the power generation system 2 in the battery system 20, and may supply the generated power to the grid 3. The energy storage system 1 may supply power stored in the battery system 20 to the grid 3, or may store power supplied from the grid 3 in the battery system 20. Also, when the grid 3 is in an abnormal state, for example, when a power failure occurs in the grid 3, the energy storage system 1 performs an uninterruptible power supply (UPS) operation to supply power to the load 4. Also, when the grid 3 is in a normal state, the energy storage system 1 may supply the power generated by the power generation system 2 and the power stored in the battery system 20 to the load 4.

The energy storage system 1 includes a power conversion system (PCS) 10, the battery system 20, a first switch 30, a second switch 40, and the like.

The PCS 10 converts power of the power generation system 2, the grid 3, and the battery system 20 into power appropriate for a destination, and supplies the appropriate power to the destination. The PCS 10 includes a power converting unit 11, a direct current (DC) link unit 12, an inverter 13, a converter 14, and an integrated controller 15.

The power converting unit 11 is a device for converting power between the power generation system 2 and the DC link unit 12. The power converting unit 11 sends power generated by the power generation system 2 to the DC link unit 12. At this time, the power converting unit 11 converts a voltage output by the power generation system 2 into a DC link voltage.

The power converting unit 11 may be configured as a power conversion circuit such as, for example, a converter or a rectifier circuit according to the type of the power generation system 2. When power generated by the power generation system 2 is DC power, the power converting unit 11 may be a converter for converting the DC power into DC power. On the other hand, when the power generated by the power generation system 2 is AC (e.g., alternating current) power, the power converting unit 11 may be a rectifier circuit for converting the AC power into DC power. In particular, when the power generation system 2 is a solar power generation system, the power converting unit 11 may include a maximum power point tracking (MPPT) converter for performing MPPT controlling so as to improve or maximize power generated by the power generation system 2 according to variations in, for example, solar insulation or temperature. When the power generation system 2 does not generate any power, the power converting unit 11 may stop operating to reduce or minimize power consumed by a converter or the like.

A magnitude of the DC link voltage may be unstable due to factors such as, for example, a sudden drop in voltage output by the power generation system 2 or the grid 3, generation of a peak load in the load 4, or the like. However, the DC link voltage may need to be stable for normal operations of the converter 14 and the inverter 13. The DC link unit 12 is electrically coupled between the power converting unit 11 and the inverter 13 so as to maintain the DC link voltage as constant. The DC link unit 12 may be, for example, a large capacity capacitor.

The inverter 13 is a power conversion device electrically coupled between the DC link unit 12 and the first switch 30. The inverter 13 may include an inverter for converting the DC link voltage output from the power generation system 2 and/or the battery system 20 in a discharging mode into an AC voltage of the grid 3, and outputting the AC voltage. Also, the inverter 13 may include a rectifier circuit for rectifying the AC voltage of the grid 3, converting the AC voltage into the DC link voltage, and outputting the DC link voltage to store power of the grid 3 in the battery system 20 in a charging mode. Alternatively, the inverter 13 may be a bidirectional inverter in which directions of input and output may be changed.

The inverter 13 may include a filter for removing a harmonic wave from an AC voltage output to the grid 3. The inverter 13 may also include a phase locked loop (PLL) circuit for synchronizing a phase of the AC voltage output from the inverter 13 and a phase of an AC voltage of the grid 3 to reduce or prevent the generation of reactive power. The inverter 13 may also perform functions such as, for example, restriction of a voltage fluctuation range, improvement of a power-factor, elimination of a DC component, protection from transient phenomena, and the like. When the inverter 13 is not used, the inverter 13 may stop operating to reduce or minimize power consumption.

The converter 14 is a power conversion device electrically coupled between the DC link unit 12 and the battery system 20. The converter 14 includes a converter for DC-DC converting power stored in the battery system 20 into a voltage level required in the inverter 13, that is, for converting stored power into the DC link voltage, and outputting the DC link voltage in a discharging mode. Also, the converter 14 includes a converter for DC-DC converting a voltage of power output from the power converting unit 11 or power output from the inverter 13 into a voltage level required in the battery system 20, that is, into a charging voltage, in a charging mode. Alternatively, the converter 14 may be a bidirectional converter, in which directions of input and output may be changed. When the battery system 20 does not need to be charged or discharged, the converter 14 may stop operating to reduce or minimize power consumption.

The integrated controller 15 monitors states of the power generation system 2, the grid 3, the battery system 20, and the load 4, and controls operations of the power converting unit 11, the inverter 13, the converter 14, the battery system 20, the first switch 30, and the second switch 40 according to a result of the monitoring and an algorithm (e.g., a predetermined algorithm). The integrated controller 15 may monitor, for example, whether there is a power failure in the grid 3, whether power is generated by the power generation system 2, an amount of power generated by the power generation system 2, a charging state of the battery system 20, an amount of power consumed by the load 4, a time, and the like. Also, when the power to be supplied to the load 4 is not sufficient, for example, when a power failure occurs in the grid 3, the integrated controller 15 may determine priorities with respect to power consumption devices included in the load 4, and may control the load 4 to supply power to a power consumption device having a high priority.

The first switch 30 and the second switch 40 are electrically coupled to each other in series between the inverter 13 and the grid 3, and control current flow between the power generation system 2 and the grid 3 by performing an on/off operation under the control of the integrated controller 15. The on/off operation of the first switch 30 and the second switch 40 may be determined according to states of the power generation system 2, the grid 3, and the battery system 20.

In detail, when power of the power generation system 2 and/or the battery system 20 is supplied to the load 4, or when power of the grid 3 is supplied to the battery system 20, the first switch 30 is set to an on state. When power of the power generation system 2 and/or the battery system 20 is supplied to the grid 3, or when power of the grid 3 is supplied to the load 4 and/or the battery system 20, the second switch 40 is set to an on state.

Meanwhile, when there is a power failure in the grid 3, the second switch 40 is set to an off state and the first switch 30 is set to an on state. That is, power is supplied from the power generation system 2 and/or the battery system 20 to the load 4, and at the same time, power supplied to the load 4 is prevented from flowing to the grid 3. Thus, accidents, such as a worker being shocked by a power line of the grid 3, may be prevented from occurring by preventing transmission of power from the energy storage system 1 to the grid 3.

The first switch 30 and the second switch 40 may each be a switching device such as, for example, a relay capable of withstanding a large capacity current.

The battery system 20 receives power of the power generation system 2 and/or the grid 3, stores the power therein, and supplies the power stored to the load 4 or the grid 3. The battery system 20 may include a part for storing power, and a part for controlling and protecting the part for storing power. Hereinafter, the battery system 20 will be described in detail with reference to FIG. 2.

Figure 2:
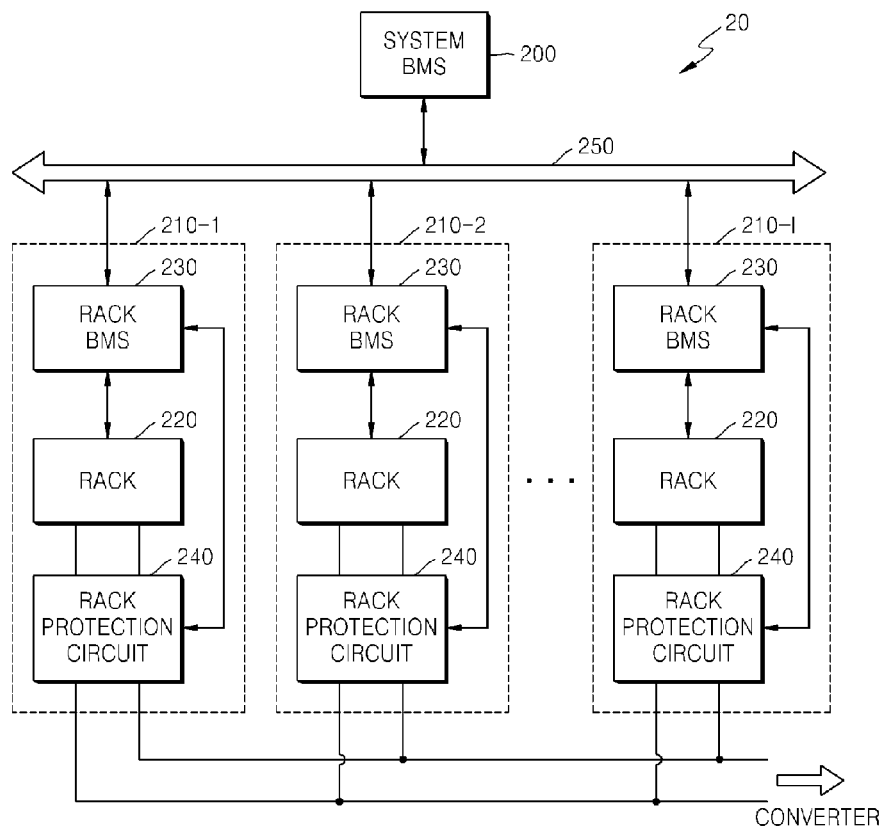
FIG. 2 is a block diagram of a battery system, according to an embodiment of the present invention.

FIG. 2 is a block diagram of the battery system 20, according to an embodiment of the present invention.

Referring to FIG. 2, the battery system 20 may include a plurality of battery subsystems (e.g., battery racks) 210-1 to 210-*l*, a system controller (e.g., a system battery management system (BMS)) 200, and a first bus line 250 for data communication.

The battery subsystems 210-1 to 210-*l* store power supplied from the outside, that is, power from the power generation system 2 and/or the grid 3, and supplies the stored power to the grid 3 and/or the load 4. The battery subsystems 210-1 to 210-*l* each may include a storage system (e.g., a rack) 220, a storage system controller (e.g., a rack BMS) 230, and a storage system protection circuit (e.g., a rack protection circuit) 240.

Figure 3:
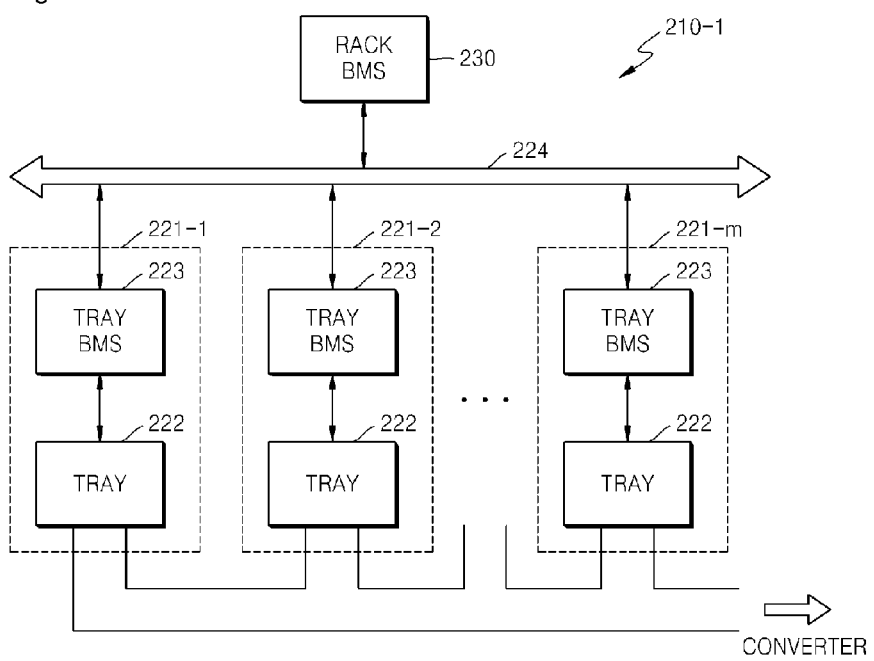
FIG. 3 is a block diagram of a battery subsystem, according to an embodiment of the present invention.

The storage system 220, which is a part for storing power, may include a module (e.g., a tray) 222 as a subcomponent (see FIG. 3). Charging and discharging operations of the storage system 220 are controlled by the storage system controller 230. The storage systems 220 may be electrically coupled to one another in series, or may be in parallel, as designed according to, for example, a voltage required to be output from the storage systems 220.

The storage system controller 230 controls the charging and discharging operations of the storage system 220 by controlling the storage system protection circuit 240. The storage system controller 230 also transmits data measured by monitoring states of the storage system 220, for example, data corresponding to a temperature, a voltage, and a current of the storage system 220, and the like, to the system controller 200.

The storage system protection circuit 240 may restrict power supply under the control of the storage system controller 230. The storage system protection circuit 240 may also measure the voltage and the current of the storage system 220, and may transmit a result of the measurements to the storage system controller 230.

Power output from the storage system 220 may be supplied to the converter 14 via the storage system protection circuit 240, and power supplied to the converter 14 from the outside may be stored in the storage system 220 via the storage system protection circuit 240. Power lines extending from the storage system protection circuits 240 may be electrically coupled to the converter 14 in parallel. However, the present invention is not limited thereto, and the power lines may be electrically coupled to the converter 14 in series, or in a combination of series and parallel, as designed according to, for example, an amount of power output from the storage system 220, a magnitude of a voltage output from the storage system 220, or the like.

The first bus line 250 is a path for transmitting data or commands between the system controller 200 and the storage system controllers 230. A communication protocol between the system controller 200 and the storage system controllers 230 may be controller area network (CAN) communication. However, the present invention is not limited thereto, and thus, any communication protocol for transmitting data or commands by using a bus line may be used.

Hereinafter, the battery subsystem 210-1 will be described in detail with reference to FIG. 3, which is a block diagram of the battery subsystem 210-1, according to an embodiment of the present invention.

Referring to FIG. 3, the battery subsystem 210-1 may include a plurality of battery modules (e.g., battery trays) 221-1 to 221-*m*, the storage system controller 230, and a second bus line 224 for data communication. The battery subsystem 210-1 may also include the storage system protection circuit 240, which is not shown in FIG. 3.

The battery modules 221-1 to 221-*m*, which are subcomponents of the storage system 220, store power, and supply the stored power to the grid 3, the load 4, etc. The battery modules 221-1 to 221-m may each include the module 222 and a module controller (e.g., a tray BMS) 223.

The module 222, which is a part for storing power, may include a battery cell as a subcomponent thereof. A number of the battery cells included in the module 222 may be determined according to, for example, a voltage required to be output from the module 222. The battery cell may be any of various re-chargeable secondary batteries. Examples of a secondary battery that may be used as the battery cell may include a nickel-cadmium battery, a lead storage battery, a nickel metal hydride (NIMH) battery, a lithium ion battery, a lithium polymer battery, and the like.

Charging and discharging operations of the module 222 may be controlled by the module controller 223 (e.g., according to a program thereof). The modules 222 may also be electrically coupled to one another in series so as to generate a voltage required to be output from the storage system 220. Power lines extend from the modules 222 located at two ends from among the modules 222, which are electrically coupled to one another in series, so that power may be supplied to the converter 14 via the storage system protection circuit 240 through the power lines.

The module controller 223 controls the charging and discharging operations of the module 222. The module controller 223 also transmits data measured by monitoring properties of the module 222, for example, a temperature, a voltage, and a current of the module 222, and the like, to the storage system controller 230.

The second bus line 224 is a path for transmitting data or commands between the storage system controller 230 and the module controllers 223. A communication protocol between the storage system controller 230 and the module controllers 223 may be a CAN communication. However, the present invention is not limited thereto, and thus any communication protocol for transmitting data or commands by using a bus line may be used.

Meanwhile, in embodiments of the present invention, both the communication protocol between the system controller 200 and the storage system controller 230, and the communication protocol between the storage system controller 230 and the module controller 223, use a bus line (224/250). However, the present invention is not limited thereto, and thus, in another embodiment, only one of the two communication protocols may use a bus line.

Hereinafter, a generalized communication system will be described with reference to FIGS. 4A to 4D, which are views showing a communication system 300 having a master-slave structure, according to an embodiment of the present invention.

Figure 4A:
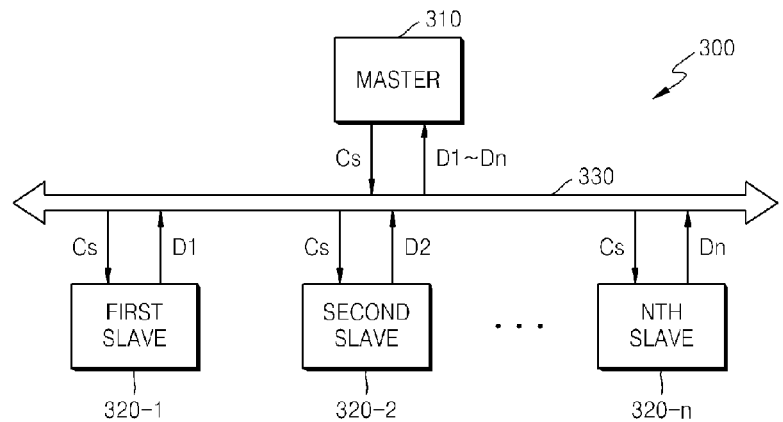
FIGS. 4A to 4D are views showing communication systems having a master-slave structure, according to embodiments of the present invention.

Referring to FIG. 4A, the communication system 300 includes a master 310, a plurality of slaves 320-1 to 320-n, and a third bus line 330.

The master 310 transmits a frame signal Cs including a command to the third bus line 330. The first to $n^{th}$ slaves 320-1 to 320-n receive the frame signal Cs and perform an operation corresponding to the command included in the frame signal Cs. The first to $n^{th}$ slaves 320-1 to 320-n respectively transmit frame signals D1 to Dn including data to the third bus line 330. At this time, the first to $n^{th}$ slaves 320-1 to 320-n may respectively transmit the frame signals D1 to Dn to the master 310 at intervals (e.g., at predetermined time intervals). The master 310 receives the transmitted frame signals D1 to Dn to perform processing.

In this regard, the master 310 may correspond to the system controller 200 illustrated in FIG. 2, and the first to $n^{th}$ slaves 320-1 to 320-n may correspond to the storage system controllers 230 illustrated in FIG. 2. Alternatively, the master 310 may correspond to the storage system controller 230 illustrated in FIG. 3, and the first to $n^{th}$ slaves 320-1 to 320-n may correspond to the module controllers 223 illustrated in FIG. 3.

Figure 4B:
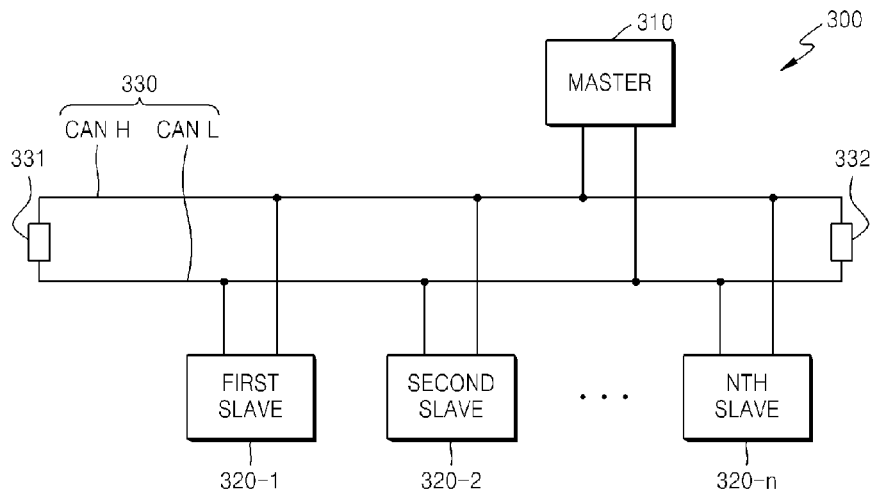

Referring to FIG. 4B, in the communication system 300 having a master-slave structure, a connection relationship between the master 310, the slaves 320-1 to 320-n (hereinafter, referred to as a 'terminal') and a bus line 330 will be shown in detail.

The bus line 330 includes two lines, that is, a first channel line CAN H and a second channel line CAN L. Also, the bus line 330 may further include end resistors 331 and 332 between the first channel line CAN H and the second channel line CAN L. Terminals of the communication system 300 communicate with each other by sensing a potential difference between the first channel line CAN H and the second channel line CAN L. In other words, if the potential difference between the first channel line CAN H and the second channel line CAN L has a positive value, the terminal recognizes this as a logical value "0 (Low)", and if the potential difference between the first channel line CAN H and the second channel line CAN L has a negative value, the terminal recognizes this as a logical value "1 (High)". Alternately, if the potential difference between the first channel line CAN H and the second channel line CAL L is 0, the terminal recognizes this as a logic value "1 (High)", and otherwise the terminal recognizes this as a logic value "0 (Low)." FIGS. 4C and 4D are views for describing the above-described two examples.

Figure 4C:
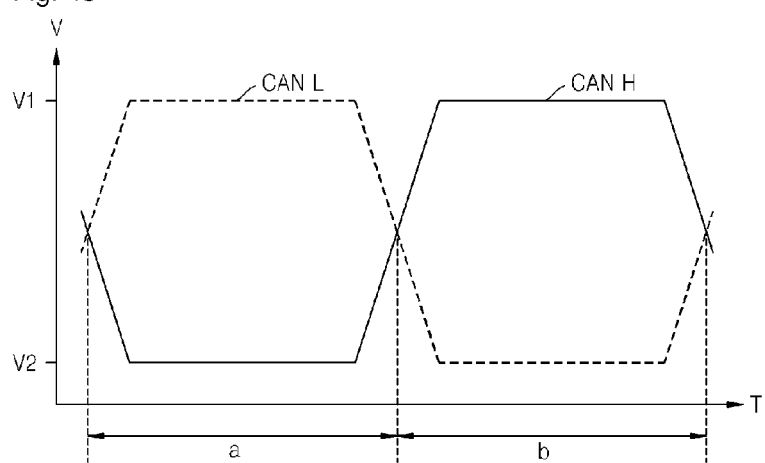
Figure 4D:
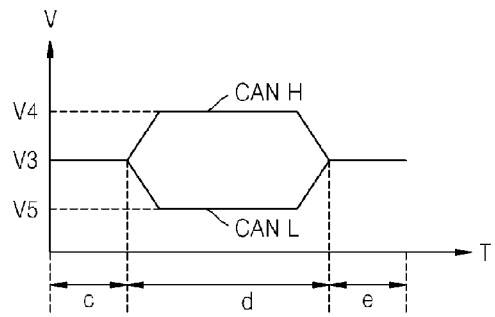

Referring to FIG. 4C, the first channel line CAN H and the second channel line CAN L include a first state having a first voltage V1 and a second state having a second voltage V2 lower than the first voltage V1, respectively. A potential difference Vdiff is a value obtained by subtracting a voltage V(CAN L) of the second channel line CAN L from a voltage V(CAN H) of the first channel line CAN H, that is, Vdiff=V(CAN H)–V(CAN L).

In a section a where the first channel line CAN H is the second state and the second channel line CAN L is the first state, the Vdiff has a negative value, and the terminal recognizes this state as a logical value "1 (High)".

On the contrary, in a section b where the first channel line CAN H is the first state and the second channel line CAN L is the second state, the Vdiff has a positive value, and the terminal recognizes this state as a logical value "0 (Low)".

Referring to FIG. 4D, the first channel line CAN H includes a third state having a third voltage V3, which is a common voltage, and a fourth state having a fourth voltage V4 higher than the third voltage V3. The second channel line CAN L includes the third state having the third voltage V3, which is a common voltage, and a fifth state having a fifth voltage V5 lower than the third voltage V3. The potential difference Vdiff is a value obtained by subtracting a voltage V(CAN L) of the second channel line CAN L from the voltage V(CAN H) of the first channel line CAN H, that is, Vdiff=V(CAN H)–V(CAN L).

In sections c and e where both the first channel line CAN H and the second channel line CAN L are the third state, the Vdiff is 0, and the terminal recognizes this state as a logical value "1 (High)".

Meanwhile, in a section d where the first channel line CAN H is the fourth state and the second channel line CAN L is the fifth state, the Vdiff has a positive value, and the terminal recognizes this state as a logical value "0 (Low)".

Hereinafter, a method of transmitting data in the communication system 300 having a master-slave structure will be described. However, waveforms shown in FIGS. 5 to 9 show that the potential difference between the first channel line CAN H and the second channel line CAN L is sensed to be converted into logical signals "0 (Low)" and "1 (High)", and the waveforms shown in FIGS. 5 to 9 do not mean a detailed signal waveform of any one bus line.

Figure 5:
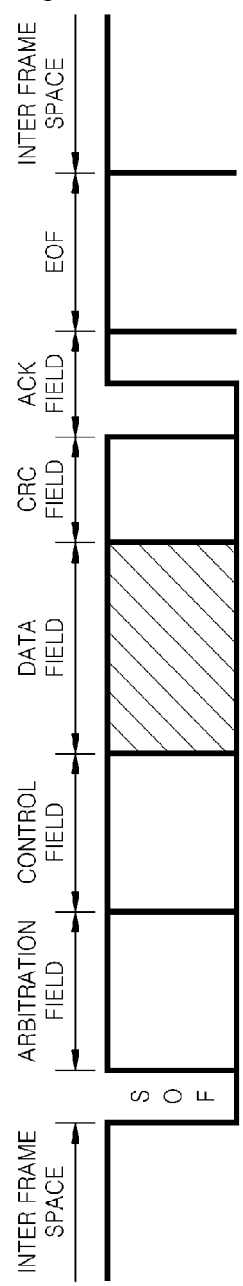
FIG. 5 is a view illustrating a frame structure of a controller area network (CAN) communication protocol, according to an embodiment of the present invention.

FIG. 5 is a view illustrating a frame structure of a CAN communication protocol, according to an embodiment of the present invention. CAN, which is a communication protocol developed by Robert Bosch GmbH to be used in the automotive industry, is additionally being used in various industry fields. CAN is a multi-master message type serial network communication method designated at a speed of an ISO 11898 specification, which is known to those skilled in the art.

Referring to FIG. 5, a message frame starts with 'start of frame (SOF)'. In this regard, 'SOF' is located at the beginning of the message frame, and has a value '0', which is a dominant bit, designated by default.

'Arbitration Field' has an identifier and a remote transmission request (RTR) bit. In this regard, the RTR bit shows whether the message frame is a data frame or a remote frame. When the message frame is a data frame at present, the RTR bit has a value '0'. On the other hand, when the message frame is a remote frame for requesting data transmission, the RTR bit has a value '1', which is a recessive bit.

'Control Field' is comprised of 6 bits. 2 bits of the 6 bits are reserved areas, and the remaining 4 bits are data length code areas showing a number of bytes of 'Data Field'.

'Data Field' includes data to be transmitted in a data frame. A size of 'Data Field' is 0 to 8 bytes, and each byte includes 8 bits. In this regard, data is transmitted from a most significant bit (MSB) in each byte.

'Cyclic Redundancy Code (CRC) Field' shows a periodical overlap checking code. 'CRC Field' is comprised of 'CRC Sequence' and 'CRC Delimiter' having a value '1'.

'ACK Field' is 2 bits, and is comprised of 'ACK Slot' and 'ACK Delimiter'. 'ACK Slot', which is a first bit, has a value '0', and the 'ACK Delimiter', which is a second bit, has a value '1'. However, 'ACK Slot' may be recorded as a value '1' transmitted from another node having successfully received a message.

'End of Frame (EOF)' is 7 bits, each bit having a value '1', thus indicating that the message frame is finished.

'Interframe Space' includes 'Intermission' and 'Bus Idle' (see FIG. 6), and divides the previous or following message frame from the present message frame.

Hereinafter, a method of preventing an error during communication between the master 310 and the first to $n^{th}$ slaves 320-1 to 320-$n$ will be described. For convenience of description, it is assumed that the master 310 exchanges a data frame with one of the first to $n^{th}$ slaves 320-1 to 320-$n$.

Figure 6:
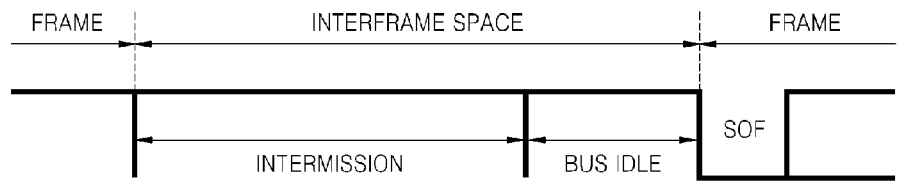
FIG. 6 is a view illustrating an interframe space of a CAN communication protocol, according to an embodiment of the present invention.

FIG. 6 is a view illustrating an INTERFRAME SPACE of a CAN communication protocol, according to an embodiment of the present invention.

Referring to FIG. 6, the interframe space is formed between frames. The interframe space includes an 'Intermission' section and a 'Bus Idle' section.

The 'Intermission' section is comprised of successive three dominant bits, each having a value '1'. During the 'Intermission' section, no station may transmit a data frame or a remote frame.

The 'Bus Idle' section has an arbitrary length. When the third bus line 330 is recognized as being free, any station may access the third bus line 330 in order to transmit a message, for example, a command or data. A message, which was on standby during transmission of another message, starts being transmitted from a first bit after the 'Intermission' section. If one value '0', which is a recessive bit, is detected in the third bus line 330, it is interpreted as 'SOF'.

Figure 7:
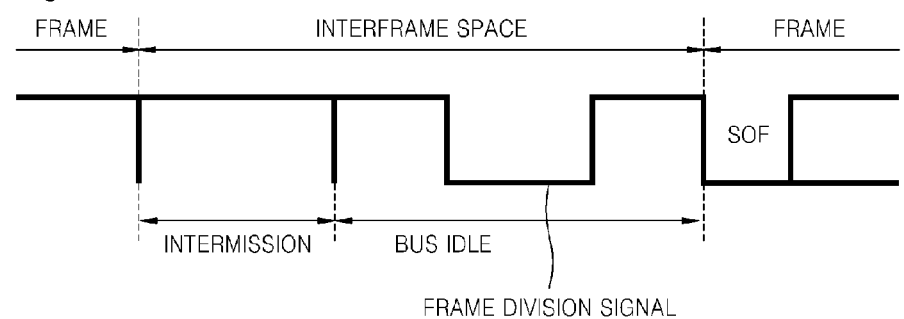
FIG. 7 is a view illustrating a communication method, according to an embodiment of the present invention.

FIG. 7 is a view illustrating a communication method, according to an embodiment of the present invention.

Referring to FIG. 7, a value '0', which is a dominant bit, is applied as a frame division signal in the 'Bus Idle' section for an arbitrary period of time. That is, any one station forcibly occupies the third bus line 330 in the 'Bus Idle' section for a period of time (e.g., a predetermined period of time) regardless of message transmission. Since the value '0' continues for the period of time, the frame division signal may not be interpreted as 'SOF' by other stations. That is, a waveform of the frame division signal is different from a waveform when transmitting data, and thus, does not have any influence except for a function of occupying the third bus line 330 between the stations.

When any one station occupies the third bus line 330, other stations may not start message transmission. On the other hand, the station occupying the third bus line 330 may cancel the occupation of the third bus line 330 at any time, and the station occupying the third bus line 330 may transmit a new message, or may allow another station to transmit a new message. Accordingly, a station transmitting the frame division signal may be the master 310 or the first slave 320-1. That is, any station included in the communication system 300 may forcibly occupy the third bus line 330 with the frame division signal.

At this time, duration of the frame division signal occupying the third bus line 330 in the 'Bus Idle' section may be arbitrarily determined. When the duration is excessively long, a time to enable communication may be wasted. On the contrary, when the duration is excessively short, an error may occur due to collision between messages. The duration may be less than, for example, 1 ms. Also, the duration may be more than 20% of a length of a frame related to a message for transmitting data or a command. Alternatively, the duration may be in a range of, for example, about 100 to about 500 µs.

When the plurality of stations exchange a command or data with each other, the following situation may occur. For example, if the master 310 transmits a message to command transmission of data, the first slave 320-1 receives the message and performs an operation (e.g., necessary operation). At this time, the first slave 320-1 requires a predetermined period of time to perform the operation. If the operation is finished, the first slave 320-1 transmits a checking message to the master 310 or transmits data. However, when the interframe space between messages is in a free state, any station may transmit a message, and thus, data collision may occur. For example, when a time during which the first slave 320-1 performs the operation is set to be short, there may be a possibility that the master 310 wrongly recognizes a message transmitted from a station other than the first slave 320-1, which is the target of the command, as a message transmitted from the first slave 320-1.

However, as illustrated in FIG. 7, in the 'Bus Idle' section, in which the third bus line 330 is in a free state, the third bus line 330 is forcibly occupied by the frame division signal, thereby preventing collision occurring between messages, and also preventing any one station from wrongly receiving a message. Also, an error may be prevented in a system not having an error sensing algorithm.

The communication system 300 may be further effectively used in cases where a frequency of communication is high or where the communication system 300 includes a large number of objects, that is, a large number of the masters 310 and/or the first to $n^{th}$ slaves 320-1 to 320-$n$. Alternatively, the communication system 300 may be effectively used in a case where a load of any one station is heavy due to communication from one to many.

Also, the communication system 300 is not necessarily applied to the energy storage system 1. For example, the communication system 300 may be used in an electric vehicle or various other fields.

Figure 8:
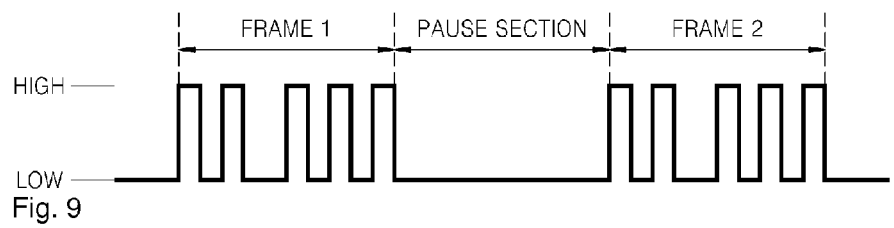
FIGS. 8 and 9 are views illustrating a communication method, according to another embodiment of the present invention.
Figure 9:
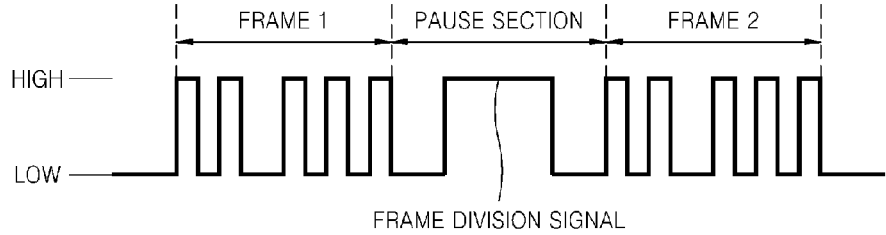

FIGS. 8 and 9 are views illustrating a communication method, according to another embodiment of the present invention. In the present embodiment, an arbitrary communication protocol, which uses a bus line, other than a CAN communication protocol is used. Also, the present embodiment is described assuming that the communication system 300 of the embodiment shown in FIG. 4A is applied.

Referring to FIG. 8, a pause section is disposed between a frame 1 and a frame 2. The frame 1 and the frame 2 transmit a message having a high level logic signal and a low level logic signal. Also, the low level logic signal is continuously applied in the pause section.

Referring to FIG. 9, the high level logic signal is applied as a frame division signal in the pause section. If the third bus line 330 is forcibly occupied by the frame division signal in the pause section by any one station included in the communication system 300, then the other stations may not transmit a message.

The station occupying the third bus line 330 by transmitting the frame division signal cancels the occupation of the third bus line 330 at an appropriate point of time. In this state, other stations may transmit a message. In this regard, the appropriate point of time may refer to a time when a station is ready to transmit a message and after a time when the station is scheduled to transmit the message.

As described above, duration of the frame division signal may be more than 20% of a length of a frame to transmit a message. Also, the duration may be, for example, less than 1 ms, or may be, for example, in the range of about 100 to about 500 μs.

As such, in the pause section where the third bus line 330 is in a free state, the third bus line 330 is forcibly occupied by the frame division signal, thereby preventing collision between messages, and also preventing any one station from wrongly receiving a message. Also, an error may be prevented in a system not having an error sensing algorithm.

Figure 10:
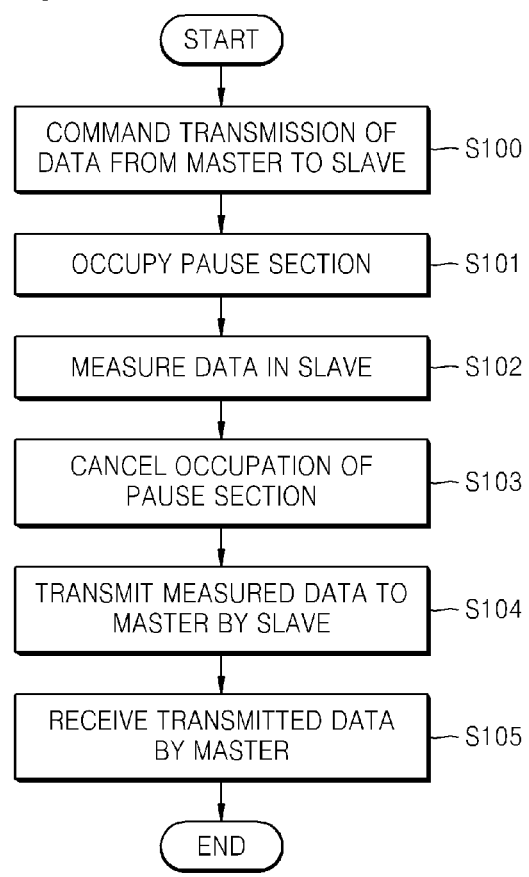
FIG. 10 is a flowchart illustrating a data transmission method of a communication system, according to an embodiment of the present invention.

FIG. 10 is a flowchart illustrating a data transmission method of a communication system 300, according to an embodiment of the present invention.

Referring to FIG. 10, a "transmission of data" command is sent from the master 310 to the first to $n^{th}$ slaves 320-1 to 320-$n$ (S100), that is, the master 310 commands transmission of data by the slaves 320-1 to 320-$n$. Then, a frame division signal is transmitted by the master 310 or any one slave, such as the first slave 320-1, which is a target of the command, and thus, the frame division signal occupies a pause section (S101). The first to $n^{th}$ slaves 320-1 to 320-$n$ measure data (S102). The occupation of the pause section is canceled at an appropriate point of time after the pause section is occupied, for example, when it is determined that any one of the first to $n^{th}$ slaves 320-1 to 320-$n$ is ready to transmit a message (S103).

The first to $n^{th}$ slaves 320-1 to 320-$n$ transmit the measured data to the master 310 (S104). The master 310 receives the transmitted data and finishes communication (S105).

Figure 11:
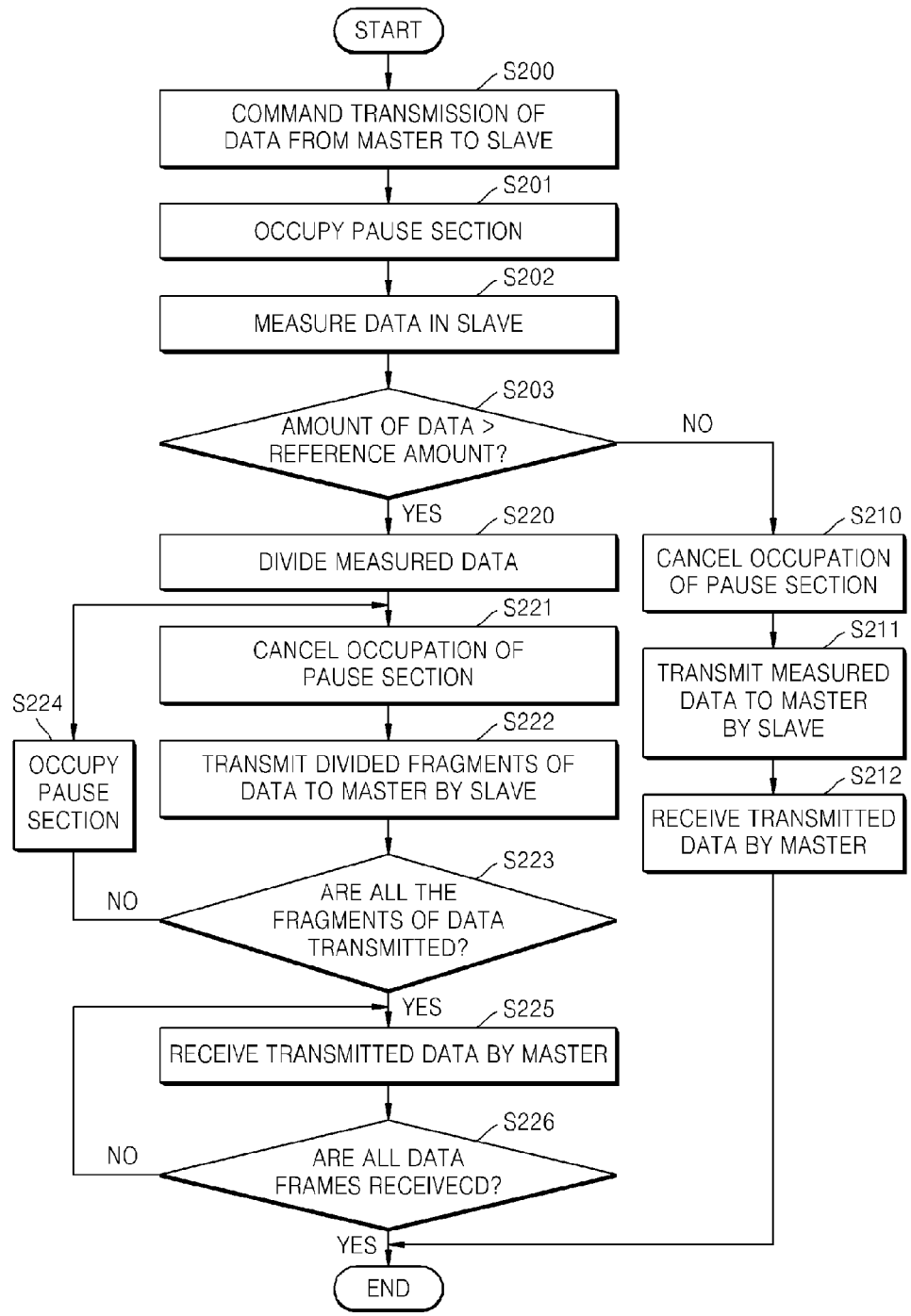
FIG. 11 is a flowchart illustrating a data transmission method of a communication system, according to another embodiment of the present invention.

FIG. 11 is a flowchart illustrating a data transmission method of the communication system 300, according to another embodiment of the present invention.

Referring to FIG. 11, data is commanded to be transmitted via a command sent from the master 310 to the first to $n^{th}$ slaves 320-1 to 320-$n$ (S200). Then, a frame division signal is transmitted by the master 310 or any one slave, such as the first slave 320-1, which is a target of the command, and thus, the frame division signal occupies a pause section (S201). The first to $n^{th}$ slaves 320-1 to 320-$n$ measure data (S202).

The first to $n^{th}$ slaves 320-1 to 320-$n$ determine, in order to transmit the data to the master 310, whether an amount of data to be transmitted is greater than a reference amount (S203). For example, in a case of CAN communication, the first to $n^{th}$ slaves 320-1 to 320-$n$ determine whether an amount of data to be inserted into a data field is greater than 8 bytes.

If the amount of data is less than a reference amount, the occupation of the pause section is canceled (S210), and the first to $n^{th}$ slaves 320-1 to 320-$n$ insert the measured data into a data field of a data frame, and transmit the data frame to the master 310 (S211). The master 310 receives the data frame transmitted from the first to $n^{th}$ slaves 320-1 to 320-$n$ (S212).

On the other hand, if the amount of data is greater than the reference amount, the first to $n^{th}$ slaves 320-1 to 320-$n$ divide the measured data into fragments of data (S220). Then, the occupation of the pause section is canceled (S221), and the first to $n^{th}$ slaves 320-1 to 320-$n$ transmit the divided fragments of data to the master 310 (S222).

The first to $n^{th}$ slaves 320-1 to 320-$n$ determine whether all of the fragments of data are transmitted (S223). When some of the fragments of data are not transmitted, the pause section is occupied again (S224). Then, the method returns to the operation S221 to transmit all of the fragments of data.

The master 310 receives the fragments of data transmitted from the first to $n^{th}$ slaves 320-1 to 320-$n$ (S225). The master 310 determines whether all fragments of data are received (S226) to receive all data measured by the first to $n^{th}$ slaves 320-1 to 320-$n$.

As described above, in a section where a bus line is in a free state, the bus line is forcibly occupied by a frame division signal, thereby preventing collision between messages, and also preventing any one station from wrongly receiving a message. Also, an error may be prevented from occurring in a system not having an error sensing algorithm.

The embodiments shown and described herein are illustrative examples of the invention, and are not intended to otherwise limit the scope of the invention in any way. For the sake of brevity, conventional electronics, control systems, software development, and other functional aspects of the systems may not be described in detail. Furthermore, the connecting lines or connectors shown in the various figures are intended to represent exemplary functional relationships and/or physical or logical couplings between the various elements. It should be noted that many alternative and/or additional functional relationships, physical connections, or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The present invention is not limited to the described order of the steps. The use of any and all examples, or exemplary language (e.g., "such as") provided herein, is intended merely to better illuminate embodiments of the invention and does not pose a limitation on the scope of the invention unless otherwise claimed. Numerous modifications and adaptations will be readily apparent to those skilled in this art without departing from the spirit and scope of the present invention.

It should be understood that the exemplary embodiments described therein should be considered in a descriptive sense only and not for purposes of limitation. Descriptions of features or aspects within each embodiment should typically be considered as available for other similar features or aspects in other embodiments.

The invention claimed is:

1. A battery system comprising:
   a system bus;
   a system controller coupled to the system bus and configured to transmit one or more first system frames on the system bus; and
   one or more battery subsystems coupled to the system bus and configured to transmit one or more second system frames on the system bus, wherein at least one of the one or more battery subsystems comprises:
      a storage system for storing power; and
      a storage system controller for controlling charging and discharging of the storage system, for receiving storage system data, and for transmitting the one or more second system frames including the storage system data on the system bus,
   wherein at least one of the system controller or the storage system controller is configured to apply a system frame division signal on the system bus between two adjacent ones of the system frames.

2. The battery system of claim 1, wherein the storage system controller is configured to control charging and discharging of the storage system.

3. The battery system of claim 1, wherein the system controller is configured to operate as a master on the system bus, and the storage system controller is configured to operate as a slave on the system bus.

4. The battery system of claim 3, wherein the system controller is configured to send a command, which commands transmission of the storage system data, to the storage system controller by transmitting at least one of the first system frames on the system bus, and the system controller or the storage system controller is configured to apply the system frame division signal on the system bus while the storage system data is being prepared.

5. The battery system of claim 4, wherein the storage system controller is configured to transmit the storage system data to the system controller by transmitting one or more of the second system frames on the system bus after the system frame division signal stops being applied to the system bus.

6. The battery system of claim 1, wherein a communication protocol between the system controller and the storage system controller of the at least one of the one or more battery subsystems is a controller area network (CAN) protocol.

7. The battery system of claim 1, wherein the at least one of the one or more battery subsystems further comprises:
   a subsystem bus; and
   one or more battery modules for storing the power, at least one of the one or more battery modules being coupled to the storage system controller through the subsystem bus.

8. The battery system of claim 7, wherein the at least one of the one or more battery modules comprises:
   one or more battery cells for storing the power; and
   a module controller for controlling charging and discharging operations of the one or more battery cells and for transmitting to the storage system controller module data corresponding to information of the one or more battery cells.

9. The battery system of claim 8, wherein the storage system controller is configured to operate as a master on the subsystem bus, and the module controller is configured to operate as a slave on the subsystem bus.

10. The battery system of claim 8, wherein the storage system controller is configured to transmit one or more first storage system frames on the subsystem bus, and the module controller is configured to transmit one or more second storage system frames on the subsystem bus.

11. The battery system of claim 10, wherein the storage system controller is configured to command transmission of the module data by transmitting at least one of the first storage system frames on the subsystem bus, and the storage system controller or the module controller is configured to apply a storage system frame division signal on the subsystem bus while the module data is being prepared.

12. The battery system of claim 11, wherein the module controller is configured to transmit the module data to the storage system controller by transmitting one or more of the second storage system frames on the subsystem bus after the storage system frame division signal stops being applied to the subsystem bus.

13. The battery system of claim 8, wherein a communication protocol between the storage system controller and the module controller of the at least one of the one or more battery modules is a controller area network (CAN) protocol.

14. A communication system having a master-slave structure comprising:
   a system bus;
   a master for transmitting on the system bus a command frame comprising a command; and
   a plurality of slaves for receiving the command frame from the system bus, for performing an operation corresponding to the command in the command frame, and for transmitting one or more data frames comprising data on the system bus,
   wherein at least one of the master or the plurality of slaves is configured to apply a frame division signal on the system bus between two adjacent ones of the frames.

15. The communication system of claim 14, wherein the frame division signal is applied on the system bus by the master or one of the slaves that last received one of the frames.

16. The communication system of claim 14,
   wherein the master is a system controller of a battery system,
   wherein the plurality of slaves are storage system controllers corresponding to racks of the battery system, and
   wherein the data corresponds to information of one or more battery cells in the battery system.

17. The communication system of claim 14,
   wherein the master is a storage system controller corresponding to a rack of a battery system,
   wherein the plurality of slaves are module controllers corresponding to trays of the rack, and
   wherein the data corresponds to information of one or more battery cells in the rack.

18. The communication system of claim 14, wherein the frame division signal is applied during an interframe space between the two adjacent ones of the frames, the interframe space comprising an intermission section and a bus idle section, a voltage level of the frame division signal applied during the bus idle section being opposite a voltage level of a remaining portion of the bus idle section.

19. A data transmission method comprising:
  transmitting a command on a bus by a master to a plurality of slaves to transmit data;
  applying a frame division signal on the bus by the master or any of the plurality of slaves that is a target of the command to initiate a transmission pause;
  when one of the slaves is ready to transmit the data on the bus, canceling the transmission pause;
  transmitting the data on the bus to the master; and
  receiving the transmitted data by the master through the bus.

20. The data transmission method of claim 19, wherein the frame division signal is applied on the bus by the master or one of the slaves that last received the transmitted command or the transmitted data.

* * * * *